Jan. 30, 1951     L. COOK     2,539,892
PRESSURE MEASURING DEVICE

Filed May 14, 1947     4 Sheets—Sheet 1

INVENTOR
LYMAN COOK
BY
Blair, Curtis & Hayward
ATTORNEYS

Jan. 30, 1951     L. COOK     2,539,892
PRESSURE MEASURING DEVICE
Filed May 14, 1947     4 Sheets-Sheet 2

INVENTOR
LYMAN COOK
BY
Blair, Curtis & Hayward
ATTORNEYS

Jan. 30, 1951      L. COOK      2,539,892
PRESSURE MEASURING DEVICE
Filed May 14, 1947      4 Sheets-Sheet 3

INVENTOR
LYMAN COOK
BY
Blair, Curtis & Hayward
ATTORNEYS

Jan. 30, 1951     L. COOK     2,539,892

PRESSURE MEASURING DEVICE

Filed May 14, 1947     4 Sheets-Sheet 4

INVENTOR
LYMAN COOK
BY
*Blair, Curtis & Hayward*
ATTORNEYS

Patented Jan. 30, 1951

2,539,892

UNITED STATES PATENT OFFICE 2,539,892

PRESSURE MEASURING DEVICE

Lyman Cook, Foxboro, Mass., assignor to The Foxboro Company, Foxboro, Mass., a corporation of Massachusetts Application May 14, 1947, Serial No. 748,008

3 Claims. (Cl. 137—153)

This invention relates to apparatus for measuring and indicating, recording, and/or controlling the value of a variable process condition, such as, pressure, differential pressure, flow, liquid level and the like. The apparatus of the invention may be used in cases where pressure is the ultimate variable to be measured and also where pressure is an intermediate variable indicative of the value of another variable. For example, the apparatus may be made responsive to the pressure difference across an orifice in a pipe through which a fluid is flowing to measure the fluid flow, or it may be made responsive to the pneumatic pressure in a bubble tube immersed to a predetermined distance in a liquid to measure the liquid level. Moreover apparatus embodying the present invention may be used to establish a pneumatic pressure that is a predetermined function of a relatively small force produced either directly or indirectly by variations in a variable process condition. For purposes of illustration the invention will be described herein as applied to the problem of measuring the differential pressure across an orifice to measure and control the flow of a fluid.

In one common type of installation for measuring fluid flow the flow of the process fluid is measured by an orifice meter which includes a mercury manometer that is responsive to the pressure difference across an orifice in a pipe through which the fluid is flowing. The meter includes a float which floats on the surface of the mercury in one arm of the manometer and is thereby positioned in accordance with variations in the differential pressure, the motion of the float being transmitted by a suitable mechanical linkage to a conventional indicating, recording and/or controlling device. Orifice meters of this type are widely used and for many purposes are quite satisfactory. They are, however, subject to certain limitations which, in some cases, circumscribe their effectiveness. Thus, for example, where the fluid being handled is highly corrosive, the surfaces of the mercury in the manometer must be protected by a sealing liquid and in extreme cases by two sealing liquids. The use of such sealing liquids is inconvenient, makes calibration of the instrument more difficult and may also introduce an error into the reading of the instrument. Also in certain types of plants the presence of mercury is objectionable and it is desirable to use a mercury-free meter.

Other problems arise where the flow of the fluid being measured is small. In a mercury manometer a significant movement of the mercury occurs in response to variations in differential pressure and thus there is a significant movement of the fluid in the pipes connecting the meter with the main conduit through which the measured fluid flows. Thus there is an appreciable withdrawal of fluid from or discharge of fluid into the main stream of fluid as the differential pressure varies, and, in cases where the fluid flow in the main stream is small this "diversionary" flow may introduce an error in the flow measurement.

In conventional mercury-filled meters the motion of the float is transmitted by a mechanical linkage through the wall of the float chamber and there is thus a possibility that the measured fluid may escape from the float chamber. If the fluid being handled is poisonous or exceptionally valuable, as, for example, where it comprises a concentrated isotope of an element, it is highly desirable, if not essential, that the responsive element of the meter be completely sealed to eliminate all possibility of escape of the fluid to the atmosphere.

In some cases the differential pressure to be measured is small and a large float must be used to provide the necessary power for driving the mechanical measuring linkage. Where such a large float is used the float chamber must be made large and the bulk of the meter is undesirably increased.

It is accordingly an object of the present invention to provide improved apparatus for measuring and indicating, recording and/or controlling the value of a variable process condition, such as pressure, differential pressure, flow, liquid level and the like. It is another object of the invention to provide an improved mercury-free gas-tight flowmeter. It is still another object of the invention to provide a completely sealed flowmeter wherein the fluid being measured is effectively prevented from coming in contact with the working parts of the meter. It is a further object of the invention to provide a flowmeter that is particularly well adapted for measuring small flows. It is a further object of the invention to provide a differential pressure meter which will not be injured by over-range pressures even when subjected to a differential pressure many times as great as its effective operating range. It is a still further object of the invention to provide improved apparatus for converting a relatively small force into a pneumatic pressure having a value corresponding to the value of said force. Other objects of the invention will be in part obvious and in part pointed out hereafter.

The many objects and advantages of the present invention may best be appreciated by reference to the accompanying drawings which illustrate apparatus incorporating a preferred embodiment and alternative embodiment of the invention and wherein.

Figure 1:
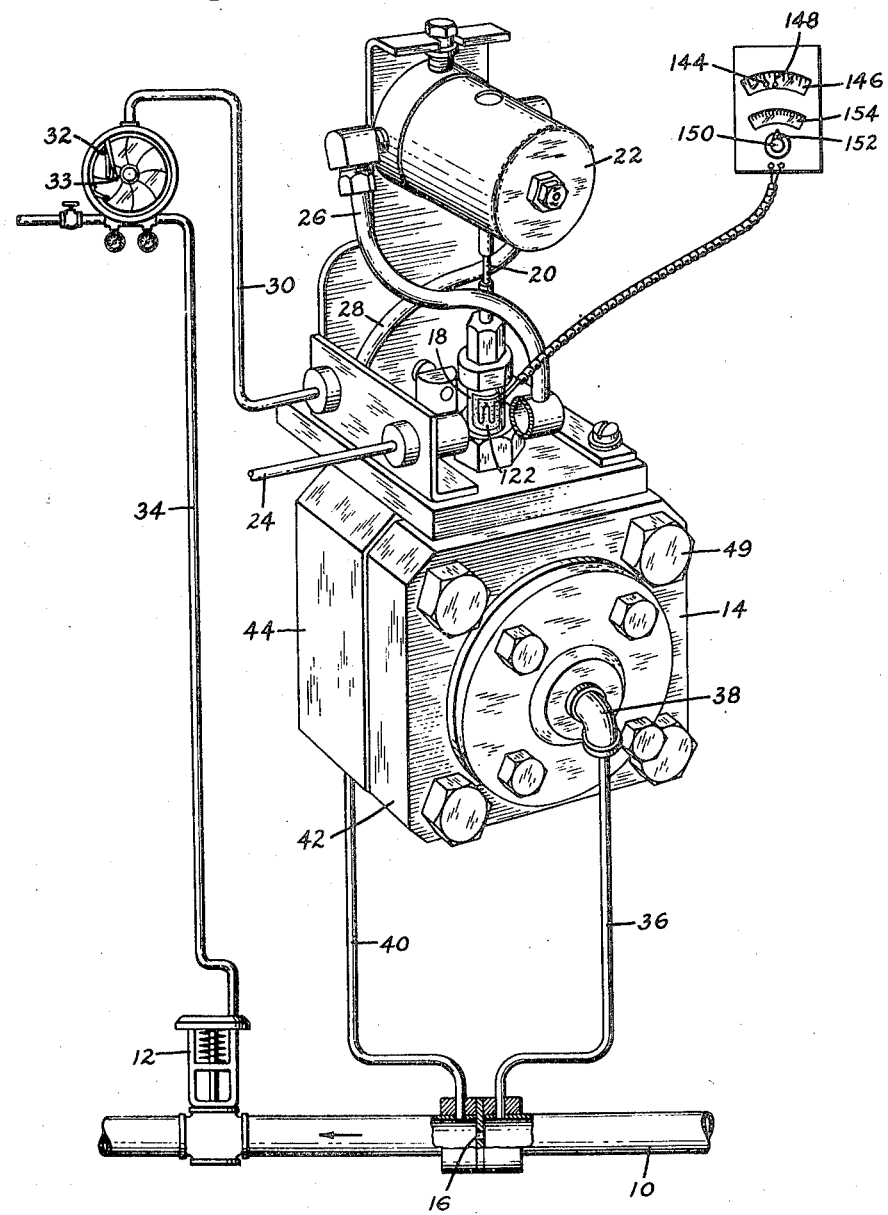
Fig. 1 is a perspective view of the preferred embodiment of the invention with certain auxiliary apparatus shown diagrammatically.

Referring to the drawings and particularly to Fig. 1 thereof, the apparatus shown in this figure is adapted to be used in controlling the flow of fluid in a pipe 10 by regulation of a pneumatically operated control valve 12. The apparatus shown comprises in general a diaphragm chamber 14 containing a diaphragm (not shown in Fig. 1) which is effectively responsive to the pressure difference across an orifice 16 in the pipe 10, and a flexible cantilever tube 18 which is flexed by the diaphragm and is provided with an upwardly extending rod 20 that extends into the pneumatic converter 22 to cause a force proportional to the differential pressure to be impressed on the converter. Air under pressure to operate the converter 22 is supplied to the converter through a supply pipe 24 and connecting pipe 26. As fully described hereafter the rod 20 exerts on a part of the converter 22 a force that is converted by the converter into a pneumatic pressure having a value that corresponds with the magnitude of the force.

The discharge pressure of the converter 22 is transmitted through a connecting pipe 28 and pipe 30 to the measuring element of a conventional pneumatic controller 32 which operates to produce an output pressure in pipe 34 that is a function of the converter discharge pressure in pipe 30. Pipe 34 is connected to valve 12 in such manner that the valve is operated in accordance with a function of the pneumatic pressure produced in pipe 34 by controller 32. Thus the apparatus shown operates to cause valve 12 to be so positioned as to maintain the flow of fluid in pipe 10 as desired. Controller 32 is provided with a pen 33 that cooperates with a chart to indicate and record the value of the discharge pressure of converter 22.

The diaphragm within the chamber 14 is made effectively responsive to the differential pressure across orifice 16 by means of a pipe 36 that is connected to a fitting 38 at the front end of diaphragm chamber 14 and a pipe 40 that is connected to a similar fitting (not shown) at the rear end of the diaphragm chamber. The internal construction of the diaphragm chamber 14 and cantilever tube 18 are best shown in Fig. 2 of the drawings and will be described primarily with reference to that figure.

Figure 2:
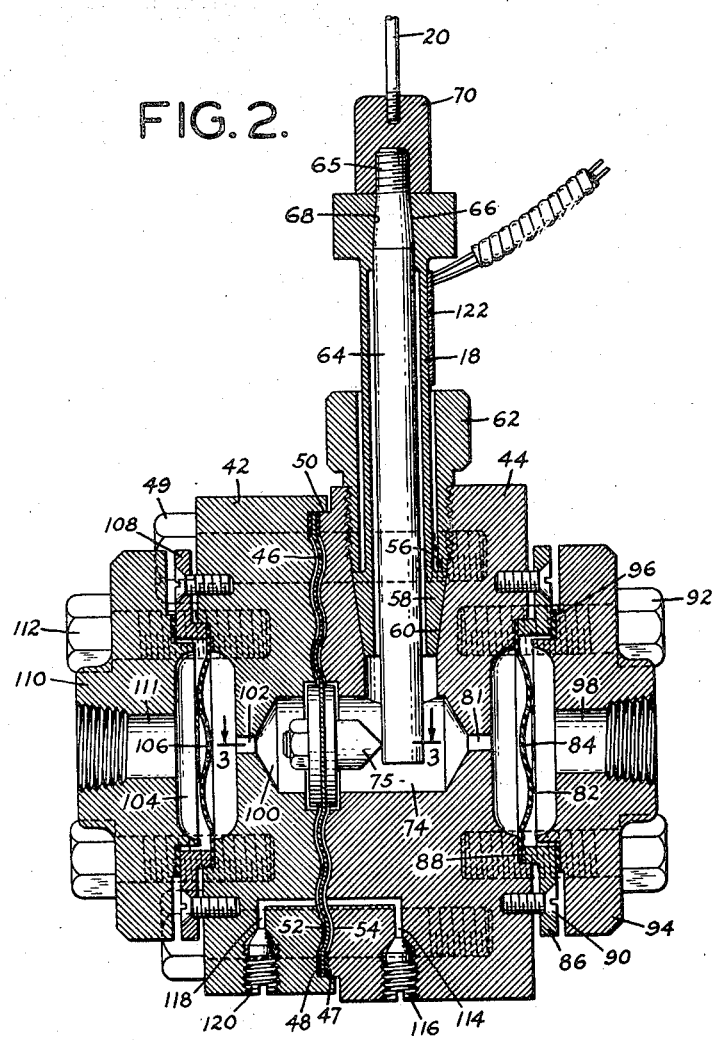
Fig. 2 is a vertical axial section through a portion of the apparatus of Fig. 1 and showing the internal construction of the diaphragm chamber and cantilever tube.

As shown in Fig. 2, and also in Fig. 1, the casing comprises in general two sections 42 and 44 having a corrugated diaphragm 46 clamped therebetween. The diaphragm 46 is made of a suitable resilient material, preferably a metal. The sections 42 and 44 are bolted together by the stud bolts 49 at each corner of the casing and the casing section 44 is provided with an annular shoulder 50 that bears against a gasket 47 at the periphery of the corrugated diaphragm 46. A second gasket 48 is positioned between the periphery of diaphragm 46 and the casing section 42. The gaskets 47 and 48 are flexible and preferably have low-flow characteristics so that as the casing sections 42 and 44 are clamped tightly together, the clearances between the diaphragm 46 and adjacent faces of the casing sections will not change and may be accurately predetermined. The construction is such that the diaphragm is clamped firmly between the casing sections and a gas-tight joint thereby provided.

The adjacent faces of the casing sections 42 and 44 are provided respectively with the convolutions 52 and 54 which conform with the corrugations of the resilient diaphragm 46 and act as stops to limit flexure of the diaphragm, thereby preventing damage to the diaphragm due to excessive flexure. The diaphragm 46 is corrugated so as to cause the deflection of the central portion of the diaphragm to be accurately proportional to the differential pressure applied to the diaphragm.

The flexible cantilever tube 18 is mounted in the casing section 44 and has a tapered lower end 58 which engages a similarly tapered surface 60 formed in the casing section 44. The tapered end 58 and surface 60 are preferably carefully machined to give a tight fit and provide a fluid-tight joint. The tube 18 is held in place within the casing section 44 by means of a threaded bushing 62 that is threaded into the casing section 44 and bears against a shoulder 56 of the tapered end 58 of tube 18.

Mounted within the tube 18 there is a rod 64 having a tapered surface 66 that engages a similarly tapered surface 68 of the top of tube 18 in such manner as to provide a fluid-tight joint between the rod and the upper end of the tube. A threaded extension 65 of rod 64 extends above the top of tube 18 and cooperates with a nut 70 which may be taken up to ensure a tight joint between the rod and the upper end of tube 18. Fixed to the top of the threaded extension 65 of rod 64 is the converter actuating rod 20 which serves in a manner described hereafter to actuate the pneumatic converter 22.

Figure 3:
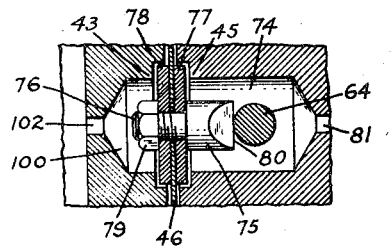
Fig. 3 is a horizontal section taken on the line 3—3 of Fig. 2 and showing the knife edge construction of the rod actuating member.

The rod 64 extends downwardly through the tube 18 into a chamber 74 formed within the casing section 44. Referring to Fig. 3, mounted on the diaphragm 46 near the center thereof, there is a rod-actuating member 75 which has a threaded extension 76 of reduced diameter that extends through a collar 77, a hole in the center of diaphragm 46 and a collar 78. A nut 79 is threaded onto the extension 76 in such manner than the collars 77 and 78 are held against opposite faces of diaphragm 46 and the rod-actuating member 75 is firmly mounted on the diaphragm with its axis precisely perpendicular to the axis of rod 64. The peripheral portions of the collars 77 and 78 lie between the annular shoulders 43 and 45 of the casing sections 42 and 44 respectively. The shoulders 43 and 45 act as stops to limit motion of the central portion of diaphragm 46 and the clearance between the collars 77 and 78 and the corresponding shoulders 45 and 43 is made slightly less than the clearance between diaphragm 46 and the adjacent faces of the casing sections 42 and 44 so that when the meter is subjected to differential pressures exceeding its normal range, the collar 77, for example, comes in contact with the shoulder 45 while the diaphragm 46 is still spaced a small amount from the adjacent face of casing section 44. It has been found that with this construction very large overrange pressures can be sustained by the diaphragm without damaging it.

This novel construction for protecting the diaphragm is particularly advantageous when the meter is used in a system having a pressure relief valve adapted to limit the system pressure. Frequently such relief valves cannot be depended upon to open and/or shut off at the precise pressure value for which they are set. With the present construction the relief valve may be set at a value substantially higher than the operative range of the meter and thus there is no danger that the relief valve will either open or fail to close at pressures within the operative range of the meter.

The rod-actuating member 75 extends into the chamber 74 and terminates in a knife edge 80 that bears against the side of rod 64. The construction is such that forces impressed on the diaphragm 46 are transmitted by the rod-actuating member 75 to the lower end of rod 64. Since thin-walled tube 18 is cantilever mounted at its lower end in casing section 44 and the rod 64 is cantilever mounted at its upper end in the upper end of tube 18, forces impressed on the lower end of rod 64 cause the flexible tube 18 to be deflected an amount which corresponds with the value of the impressed force.

The chamber 74 communicates through a passage 81 with a diaphragm chamber 82 within which there is mounted a slack diaphragm, i. e., non-resilient diaphragm 84. The chamber 74, the space between casing section 44 and diaphragm 46, the space between tube 18 and rod 64, the passage 81 and the space between diaphragm 84 and casing section 44 are completely filled with liquid in such manner that forces impressed upon the external side of diaphragm 84 are immediately and fully transmitted through the liquid to the diaphragm 46. The diaphragm 84 may be made of any suitable material such as, for example, a polytetrafluorethylene plastic, and is clamped at its periphery by a clamping ring 86 having a flange 88 that bears against the periphery of the diaphragm. The clamping ring is forced against the diaphragm periphery by means of the screws 90 which are threaded into the casing section 44. As pointed out above and indicated in Fig. 2 the diaphragm 84 is a slack diaphragm which functions to provide a closure for the space within casing section 44 that is filled with liquid and offers no resistance to forces impressed thereon.

Bolted to the casing section 44 by means of the bolts 92 there is a closure ring 94, the inner surface of which is recessed and partially defines the diaphragm chamber 82. A gasket 96 is provided between the closure ring 94 and clamping ring 86 to provide a gas-tight seal therebetween. The closure ring 94 is provided with an internal bore 98 that communicates with the diaphragm chamber 82 and the construction is such that the external surface of diaphragm 84 communicates with the pressure in pipe 10 downstream of orifice 16 through the bore 98 and pipe 40.

The casing section 42 is provided with an internal chamber 100 that communicates through a passage 102 with a diaphragm chamber 104 containing a slack diaphragm 106 similar to the diaphragm 84. The diaphragm 106 is held in place by a clamping ring 108 similar to the clamping ring 88 and the diaphragm chamber 104 is partially defined by the inner recessed surface of a closure ring 110, similar to the closure ring 94, which is bolted into the casing section 42 by means of the bolts 112. The closure ring 110 is provided with a central bore 111 into which the fitting 38 (see Fig. 1) is threaded.

The space between the diaphragm 46 and the diaphragm 106, i. e., the chamber 100, passage 102 and inner portion of diaphragm chamber 104 is filled with a liquid which may be the same liquid as that contained in the chamber 74. The construction is such that the external surface of diaphragm 106 communicates through the central bore 111 of closure ring 110, fitting 38 and pipe 36 with the pressure in pipe 10 upstream of orifice 16. Hence the differential pressure across the orifice is impressed upon the diaphragms 84 and 106 and transmitted through the liquid to the diaphragm 46 which in turn, through rod-actuating member 75, exerts a corresponding force on the rod 64 and produces a corresponding deflection of the cantilever-mounted flexure tube 18.

In order to fill the interior spaces of the diaphragm chamber with liquid, filling means are provided near the bottom of the diaphragm chamber. Within the casing section 44 there is a passage 114 provided at its outer end with a filling plug 116 and within the casing section 42 there is a passage 118 provided at its outer end with a filling plug 120. In filling the interior spaces of the diaphragm chamber, the chamber is inverted, the filling plugs 116 and 120 removed and the filling liquid, e. g., kerosene, caused to flow through the passages 114 and 118 into the interior portions of the diaphragm chamber, after which the filling plugs are replaced. In order that the interior spaces of the diaphragm chamber be completely filled with liquid, it is usually desirable to evacuate the interior of the chamber to a relatively low pressure before admitting the filling liquid. The filling liquid is preferably introduced until the slack diaphragms 84 and 106 are in approximately the positions shown in Fig. 2.

The magnitude of the differential pressure may be measured by measuring the deflection of the tube 18 in any of various ways. Two illustrative ways of measuring this deflection are shown in the drawings, one of which involves the use of a strain gage 122 mounted on the outer surface of the tube 18 and the other of which involves the use of the pneumatic converter 22 which may be made responsive to a force exerted by the converter actuating rod 20 to produce a pneumatic pressure of a magnitude corresponding to that of the force.

Figure 6:
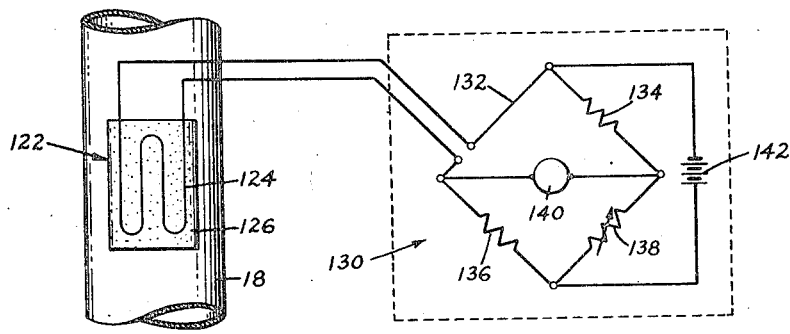
Fig. 6 is a diagram showing the mounting of the strain gage on the cantilever tube and an associated electrical measuring circuit for measuring the resistance of the strain gage.

The construction of the strain gage is best shown in Figs. 1 and 6 of the drawings and may be of the type generally shown in U. S. Patent 2,292,549 to Edward E. Simmons, Jr. The gage preferably includes an element comprising a winding 124 of fine electrical resistance wire suitably bonded to a thin supporting sheet 126 which is in turn bonded to the outer surface of tube 18. The wire used may be of the order of one mil in diameter. As shown in Figs. 1 and 6 the element comprises a filament 124 of resistance wire arranged in an elongated sinuous pattern on the thin supporting sheet 126 which may be a sheet of paper and is bonded to the paper by an adhesive such as "Bakelite" cement in such manner that each segment of the wire throughout is effective length is firmly bonded to the paper.

The paper 126 having the winding of resistance wire thereon is then firmly bonded to the surface of the tube 18 with the lengths of the resistance wire parallel to the axis of the tube so that as the tube is deflected the resistance wire 124 is proportionally strained and its resistance thereby varied. Thus the change in resistance of the wire 124 is a measure of the deflection of the tube 18 which is in turn a measure of the differential pressure across the orifice 16 and hence changes in the resistance of wire 124 may be measured as a measure of changes in the differential pressure.

The element 122 is connected to a resistance measuring device generally indicated by the numeral 130. Various resistance measuring devices well known in the art may be used but for purposes of illustration a simple measuring circuit is shown in Fig. 6. As shown in this figure the element 122 is connected into the arm 132 of a Wheatstone bridge, other arms of which contain the fixed resistors 134 and 136 and the variable resistor 138. A galvanometer 140 is connected across the bridge in the usual manner and electrical energy is supplied to the bridge from a suitable source such as the battery 142. As the element 122 is strained and its resistance thereby varied, the bridge is unbalanced and the needle of the galvanometer 140 deflects. The variable resistor 138 is then adjusted to bring the galvanometer back to its zero or null position.

Referring now to Fig. 1 of the drawings the needle 144 of galvanometer 140 is shown as cooperating with a scale 146 having a zero or null point 148. The knob 150 is mechanically interconnected with the variable resistor 138 and is provided with an index 152 that cooperates with a stationary reference scale 154. When the bridge becomes unbalanced the knob 150 is rotated to bring the needle 144 back to the null position 148 and the amount that the knob must be rotated to bring the needle back to its null position is a measure of the change in resistance of the element 122. The reference scale 154 may, if desired, be calibrated in terms of differential pressure in which case the index 152 indicates on scale 154 the value of the differential pressure.

It is to be understood that the measuring circuit shown in Fig. 6 and described above is included for purposes of illustration only. The variation in the resistance of wire 124 is in many cases not very great and hence to obtain the desired accuracy of measurement it may be desirable in some cases to use more elaborate measuring devices that are capable of giving considerably greater accuracy than the device described above. One type of measuring apparatus that may be used with particular advantage in conjunction with apparatus embodying the present invention is disclosed in a copending application of Wilfred H. Howe and Robert W. Cushman, Serial No. 496,438, filed July 28, 1943.

It may be noted that variations in the resistance of strain gage element 122 may be used to control the flow of fluid through pipe 10. Thus the wire 124 may be connected to a controller of any suitable and well-known type or an electronic instrument such as that shown in the above-identified Howe et al. application to adjust valve 12 or some other type of valve in pipe 10 to regulate the flow of fluid through the pipe. Also two strain gage elements may be mounted on opposite sides of the flexible tube 18 in such manner that one gauge is placed in tension and the other in compression as the tube deflects. The two elements may be connected into the measuring circuit in such manner that their resistance changes are additive. These and other modifications of the strain gage method of measuring the deformation of a member such as the flexible tube 18 are described fully in the above-identified Howe et al. application.

Figure 5:
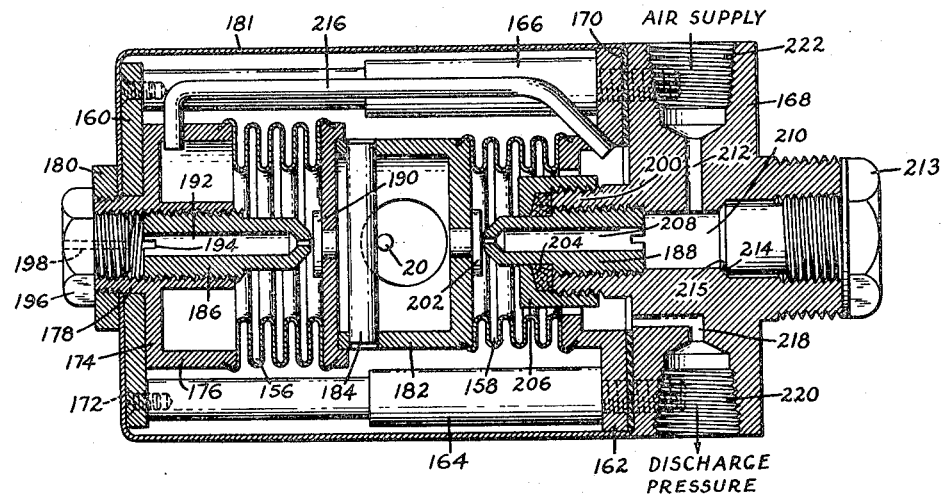
Fig. 5 is a horizontal section taken on the line 5—5 of Fig. 4 and showing the internal construction of the pneumatic converter, i. e., a converter for converting force into pneumatic pressure.

In cases where it is desired to measure the deflectional movement of the tube, by measuring a force which is a function of the tube movement, a pneumatic converter having the characteristics of the pneumatic converter 22 may be advantageously used. Referring particularly to Fig. 5, the converter comprises in general a pair of opposed bellows 156 and 158, the bellows 156 being somewhat larger in diameter than the bellows 158 to cause the bellows to exert an unbalanced force in a manner described more fully hereafter. The bellows 156 and 158 are fixed at their outer ends to a frame comprising the end plates 160 and 162 which are interconnected by the tie rods 164 and 166. The tie rods 164 and 166 are provided at one end with threaded extensions which are threaded through end plate 162 into a header 168, a gasket 170 being provided between the end plate 162 and header 168 to ensure a gastight joint. The end plate 160 is fixed to the tie rods 164 and 166 by means of screws 172 that pass through end plate 160 and are threaded into the ends of the tie rods.

Located between end plate 160 and the outer end of bellows 156 there is a cupped bellows mounting 174 having a peripheral flange 176 to which the end of the bellows is fixed. As indicated in Fig. 5 the end of the bellows is passed over the edge of flange 176 and fixed to the flange in any suitable manner, such as soldering or welding, to provide a gas-tight joint between the bellows and the bellows mounting 174 and to ensure proper alignment of bellows 156 with bellows 158. The bellows mounting 174 is provided with a neck 178 that extends through the end plate 160 and is externally threaded to receive a nut 180 by means of which the bellows mounting is fixed to the frame. The nut 180 also serves to hold in place a dust cover 181 which, as shown in Fig. 5, surrounds the bellows assembly and its associated mounting frame. The dust cover 181 is not gas-tight and hence the space between the cover and the bellows is at atmospheric pressure.

The outer end of bellows 158 is fixed to the end plate 162 of the frame in a manner similar to that in which bellows 156 is fixed to mounting 174 and hence the outer ends of the two bellows are maintained in fixed relation with respect to one another. The inner (movable) ends of the bellows 156 and 158 are fixed to a movable frame 182 in which a bearing rod 184 is mounted in a position perpendicular to the converter actuating rod 20 which extends up into the interior of the converter and bears against the bearing rod 184. The bearing rod and converter actuating rod are at right angles with respect to one another and hence there is a substantially frictionless point contact between them. The construction is such that the movable frame 182 is subjected to a force exerted by the converter actuating rod 20 and since the inner ends of bellows 156 and 158 are fixed to the movable frame there is a tendency for the inner ends of the bellows to be moved in the direction of the force exerted by the converter actuating rod 20. This tendency is continuously and automatically opposed by a pneumatic pressure established within the bellows in a manner now to be described.

Mounted within the bellows 156 and 158 respectively are the nozzles 186 and 188. The nozzle 186 is threaded into the bellows mounting 174 in such manner that its inner end is located close to the movable frame 182 and more particuarly to the adjacent surface of a button 190 mounted in the frame. The button 190 has a carefully machined smooth surface confronting the end of the nozzle 186 and is adapted to act as a baffle and cooperate with the nozzle to regulate flow of air through the nozzle. The nozzle is provided with an internal bore 192 through which air may pass and, at its outer end, is provided with a kerf 194 by means of which the nozzle may be rotated to adjust the clearance between the inner end of the nozzle and the surface of button 190. A cap screw 196 having an internal passage 198 is threaded into the bellows mounting 174 to cover the outer end of nozzle 186. The internal bore 192 of nozzle 186 communicates with atmosphere through the passage 198.

The header 168 is provided with a neck 200 that extends through the end plate 162 into the interior of bellows 158 and is both externally and internally threaded. The nozzle 188 is threaded into the interior of neck 200 to a point such that its inner end is adjacent to movable frame 182 and more particularly a button 202 mounted in the movable frame and, like button 190, having a machined surface adapted to act as a baffle and cooperate with the inner end of the nozzle 188 to regulate air flow through the nozzle. To prevent escape of air between nozzle 188 and the neck 200 of header 168 a suitable packing 204 is provided which is held in place by a packing nut 206 threaded over the neck 200. The nozzle 188 like the nozzle 186 is provided at its outer end with a kerf which permits the nozzle to be rotated to adjust the clearance between the inner end of the nozzle and button 202.

The nozzle 188 is provided with an internal bore 208 through which air may pass to the interior of bellows 158 and this internal bore communicates with a source of air under pressure through passages 210 and 212 and the air inlet connection 222 in the header 168. The outer end of passage 210 is closed by a cap screw 213 which is threaded into the passage 210 and at its inner end is provided with a tapered surface 214 that cooperates with a similarly tapered surface 215 formed in the header 168 to produce, when the cap screw 213 is tightened, a gas-tight joint.

The interiors of bellows 156 and 158 are interconnected by an unrestricted conduit 216 which serves to conduct air from one bellows to the other and thereby maintain equal pressures in the bellows. The interior of bellows 158 is also connected through a passage 218 formed in the header 168 with the discharge connection 220 of the converter.

In operation air under pressure is supplied to the inlet connection 222 in the header 168 and flows through passages 212 and 210 and the bore 208 of nozzle 188 to the interior of bellows 158, thence through conduit 216 to the interior of bellows 156 and through the bore 192 of nozzle 186 and passage 198 to atmosphere. The clearance between nozzles 186 and 188 and buttons 190 and 202, respectively, is quite small, i. e., of the order of .001 of an inch and hence a very small movement of frame 182 is capable of changing substantially the amount by which the flow of air through the nozzles is restricted and thus changing the pressure within the bellows 156 and 158. As the frame 182 moves to the left as shown in Fig. 5 the clearance between nozzle 188 and button 202 increases and the discharge of air from the nozzle also increases. At the same time, the clearance between nozzle 186 and button 190 decreases and hence flow of air through nozzle 186 decreases. Thus the effect of movement of frame 182 to the left is to increase the pressure within the two bellows. Since the bellows 156 is somewhat larger in diameter than the bellows 158, the force exerted on the frame by the bellows 156 is greater than the force exerted by bellows 158 and hence increasing pressures within the two bellows produce an unbalanced force that tends to oppose movement of frame 182. As the frame 182 moves to the right as shown in Fig. 5 pressure in the two bellows decreases. The net effect of these actions and reactions is that the force exerted by converter actuating rod 20 on frame 182 causes a pressure to be established within the bellows 156 and 158 that opposes and corresponds in magnitude with the impressed force and this counterbalancing force is established with only a very small movement of the rod 20. In other words the converter operates on a "force-balance" principle. The pressure within the bellows may be transmitted through passage 218 and discharge connection 220 to the controller 32 (see Fig. 1) or to another suitable indicating, recording or controlling device.

Figure 7:
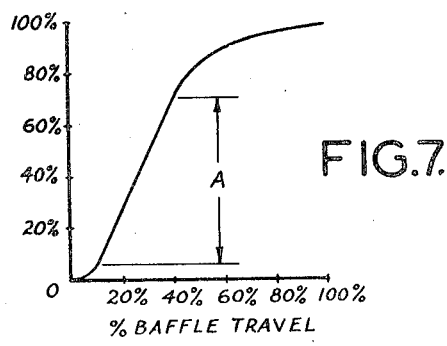
Fig. 7 is a diagram showing the relationship between changes in the pneumatic output pressure of the converter with changes in the clearance between a nozzle and baffle of the converter.

In converters for converting a force into a pneumatic pressure for control purposes, it is desirable that the pneumatic pressure established be as nearly as possible proportional to the impressed force. The structure shown in Fig. 5 of the drawings is capable of maintaining such a proportional relationship over an unusually wide range of values and in order to point out the advantages of the present converter in this respect it will be helpful to refer to Fig. 7 of the drawings. Fig. 7 is a plot showing the relationship between the pressure within the bellows 156 and 158 and the position of frame 182 and baffles 190 and 202 with respect to nozzles 186 and 188. On the ordinate scale 100% represents the maximum bellows pressure that can be obtained in the two bellows by movement of the frame 182 and its associated baffles and zero per cent represents the minimum bellows pressure that can be obtained in this way. On the abscissa scale 100% baffle travel represents the position of the frame 182 which produces maximum pressures in the bellows, i. e., a position of frame 182 such that baffle 190 is relatively close to nozzle 186 and baffle 202 is relatively distant from nozzle 188. Zero per cent on the abscissa scale represents a frame position which produces minimum pressure in the bellows. From a consideration of Figs. 5 and 7 it is apparent that when the frame is so positioned that baffle 190 is relatively close to nozzle 186 the pressure within the two bellows will be at maximum value. As the frame moves away from the nozzle 186 the change in pressure within the bellows for a given change in the position of the frame is at first relatively small, then becomes larger and finally, as the bellows pressure begins to approach its minimum value, become smaller again and approaches zero as a limit. In the intermediate range, designated as A in Fig. 7, the relationship between baffle travel and pressure change within the bellows is substantially linear, that is, these two factors are strictly proportional to one another. Hence within this range the pressure established in the bellows will be proportional to the force which tends to move the frame relative to the nozzles.

In order to illustrate the wide-range proportionality of the present converter the following specific example is given: A converter of the type shown in Fig. 5 was constructed wherein the nozzle orifices were .0135 inch, the bellows diameter ratio was 1:1.11 and the maximum range of movement of the frame 182 relative to the nozzles was .003 inch. It was found that when using a supply pressure of 25 lbs./sq. in. gauge, a substantially linear relatonship between the applied force and the pressure established within the bellows could be obtained between bellows pressures of 1 lb./sq. in. and 17 lbs./sq. in. Thus the desired linear relationship is obtained over a pressure range equal to well over half the maximum pressure range, i. e., the difference between atmospheric pressure and the supply pressure. Such linearity is particularly useful where the output pressure of the converter is to be used for control purposes.

The magnitude of the range A in Fig. 7 depends upon the supply pressure to the converter, that is to say, as the supply pressure increases, the output pressure range through which there is a linear relationship between pressure change and baffle travel increases and vice versa. Since the normal range of output pressure that is used is from 3 lbs./sq. in. to 15 lbs./sq. in., the normal range used lies well within the 16-lb. range of the foregoing specific example and hence the desired linear relationship over the desired output pressure range can be achieved in most cases by using a 25 lb./sq. in. supply pressure.

Figure 4:
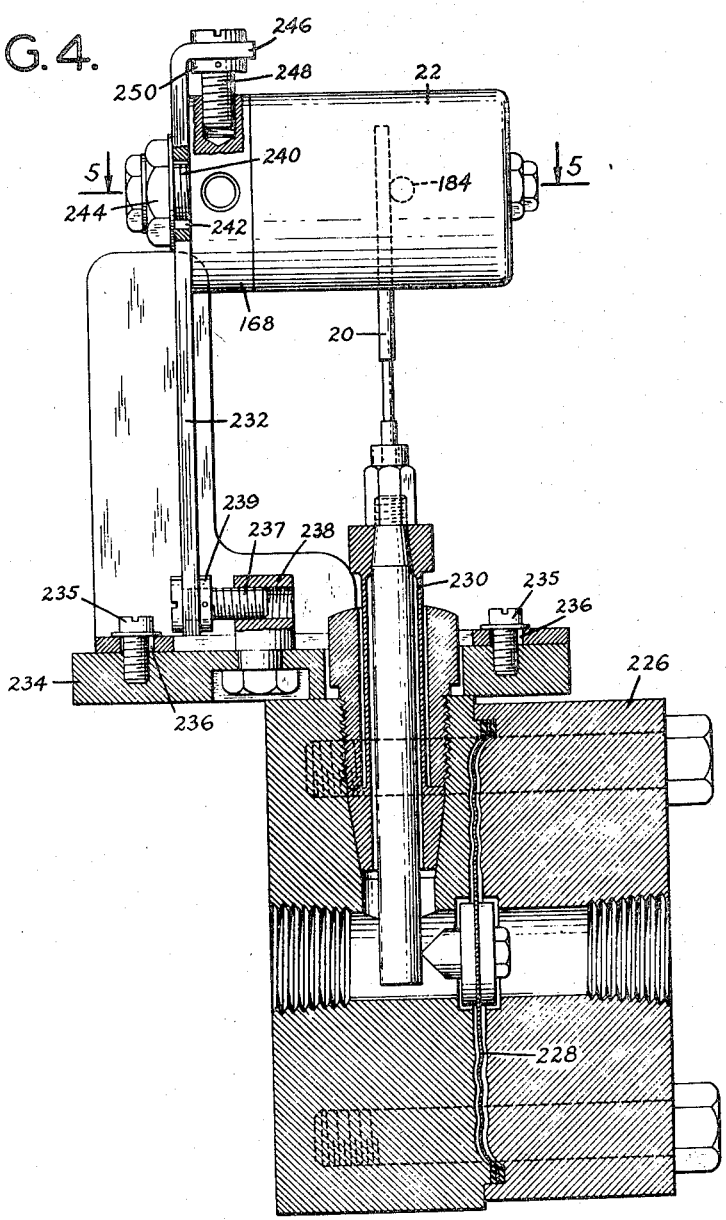
Fig. 4 is a side elevation, partly in section of a modified form of the apparatus of Fig. 2 and shows the internal construction of the diaphragm chamber of the modified apparatus.

The diaphragm chamber construction of Fig. 2 is particularly useful where the nature of the fluid being measured is such that it might injure the working parts of the meter or where it is necessary to avoid contamination of the fluid being measured, as for example, where the fluid is a food product. There are other cases, however, where the nature of the fluid is such that it can be permitted to come in contact with the working parts of the meter and in such cases the modified construction shown in Fig. 4 of the drawings may be used. Referring to Fig. 4 the diaphragm chamber 226 is similar in construction to the diaphragm chamber 14 except that the slack diaphragms 84 and 106 have been omitted and thus the flowing fluid comes in direct contact with a resilient diaphragm 228 and the interior of a cantilever mounted flexible tube 230.

It is desirable that the position of the converter 22 be made adjustable with reference to the diaphragm chamber and converter actuating rod 20. The same method of adjustment can be used with either diaphragm chamber 14 or diaphragm chamber 226 but the manner of adjustment is best shown in Fig. 4 and hence will be described with reference to that figure. Referring to Fig. 4, a converter supporting member 232 is slidably mounted on a plate 234 which is fixed to the diaphragm chamber 226. The supporting member 232 is held against the plate 234 by the screws 235 and the base of the supporting member. 232 is provided with slots indicated at 236 which permits the supporting member to be moved to move the converter 22 in a direction along its axis. In order to move the supporting member 232 with respect to plate 234 a screw 237 is mounted in the supporting member 232 and threaded into a lug 238 that is fixed to the plate 234. The screw 237 is provided with a collar 239 that is fixed to the screw 237 in such manner as to prevent axial movement of the screw with respect to the supporting member 232 while permitting rotation of the screw with respect to the supporting member.

The header 168 of converter 22 is provided with a threaded neck 240 that extends through a slot 242 in the supporting member 232 and the converter is held in place with respect to the supporting member 232 by the nut 244 which is threaded onto the neck 240. At its upper end the supporting member 232 is provided with a horizontal extension 246 in which there is mounted a screw 248 that is threaded into the top of the header 168 of converter 22. A collar 250 is fixed to the screw 248 in such manner as to prevent axial movement of the screw 248 while at the same time permitting rotation of the screw.

To effect axial movement of the converter 22 with respect to the diaphragm chamber 230 and actuating rod 20 the screws 235 are backed off slightly and the screw 237 is rotated to shift converter 22 axially and hence to move the bearing rod 184 with respect to the actuating rod 20. This adjustment provides a zero adjustment for the converter. That is to say, by relative adjustment of the position of bearing rod 184 and actuating rod 20 as described, the pressure established by the converter for a zero differential pressure across orifice 16 can be set. After the adjustment is completed the screws 235 are again tightened up to hold the converter in a fixed position with respect to the diaphragm chamber.

The converter 22 may be transversely moved with respect to the diaphragm chamber 230 by backing off nut 244 and rotating screw 248. This adjustment changes the leverage of actuating rod 20 and therefore varies the constant of proportionality between the pressure established by the converter and the measured differential pressure. After the adjustment has been completed the nut 244 is again tightened up to maintain the converter 232 in fixed relationship with respect to the diaphragm chamber 230.

From the foregoing description it is apparent that the present construction possesses numerous advantages in a wide variety of applications. The three diaphragm construction of Fig. 2 is particularly useful where it is desired to prevent the flowing fluid from becoming contaminated and, since no mercury is used, the meter may be safely used in plants such as food product plants where the presence of mercury is undesirable. This construction is also useful where it is desired to prevent the measured fluid from reaching the interior of the meter, as for example, where the measured fluid contains suspended solids that might interfere with the operation of the meter.

The slack diaphragms 84 and 106 offer substantially no resistance to forces impressed thereon but merely serve as flexible walls for the liquid-filled space between them and operate to cause impressed forces to be transmitted immediately and accurately to the resilient diaphragm 46 which is thus sensitively responsive to small changes in differential pressure. If desired, a second medium may be used between the slack diaphragms and the orifice 16. Movement of the resilient diaphragm 46 in response to differential pressure is transmitted by the rod actuating member 75 to the rod 64 and because of the knife edge construction of the actuating member there is substantially frictionless contact between the actuating member and rod. The rod and cantilever tube construction permits the diaphragm 46 to deflect in response to the differential pressure and at the same time transmits the impressed differential force to the frame 182 of the converter without requiring the frame to move appreciably. The converter operates as described above to hold the upper end of rod 22 substantially motionless.

It should be noted that although the motion of diaphragm 46 is greater than that of frame 182, it is not very large in an absolute sense. For example, a diaphragm 3" in diameter might have a maximum deflection at its center of only $\frac{1}{16}$". Thus very little flow of the measured fluid through pipes 36 and 40 is required to produce maximum deflection of the diaphragm. As pointed out above this small flow through connecting pipes 36 and 40 makes the present meter particularly useful for measuring small flows.

As indicated in Fig. 2 the rod 20 is made of small diameter to reduce stiffness. The relationship between the force exerted by diaphragm 46 on tube 18 through rod 64, and the force exerted by rod 20 on frame 182 is a function of the relative stiffness of the rod 20 and the tube. More specifically the ratio of the forces is proportional to the ratio of the spring characteristics of the rod 20 and tube 18. Hence by using this construction the effect of temperature is cancelled out. Increase in temperature will reduce the spring stiffness of the rod 20 and tube 18 equally and vice versa.

It is apparent that the rod 20 comprises an extension of the cantilever tube 18 and if the upper end of rod 20 were not restrained by the converter, it would move a greater distance than the top of the tube 18. In other words the unrestrained movement of the top of rod 20 is substantially greater than the unrestrained movement of the top of cantilever tube 18. Because of the fact that errors introduced by temperature changes and other similar factors are a function of the unrestrained range movement of the particular part, greater accuracy can be achieved by restraining the upper end of rod 20 within certain narrow predetermined limits than can be obtained by restraining the upper end of cantilever tube 18 within the same predetermined limits. Thus there is an important advantage in making the converter 22 responsive to the force exerted by the upper end of rod 20 rather than to the force exerted by the upper end of cantilever tube 18.

The converter 22 provides an effective means of converting the force exerted by the converter actuating rod into a proportional pneumatic pressure. The converter is not limited in its application to a flowmeter of the type shown in the drawings but may be used in any case where it is desired to convert force into pneumatic pressure as, for example, where it is desired to transmit the value of a force to a remote point for measurement and/or indication. In general it is desirable that the volumetric capacity of the bellows and associated pipes be made relatively small to increase the speed of response of the converter. In mounting the converter it is desirable that the axis of the converter be maintained horizontal to prevent errors that might arise because of the effect of gravitational forces on the bellows assembly.

In cases where the nature of the fluid being measured is such that it can be brought in contact with a resilient metal diaphragm, the construction of Fig. 4 may be used. In other cases the nature of the fluid may be such that it can be brought in contact with the resilient diaphragm but should be excluded from other working parts of the meter. In such cases the structure of Fig. 2 can be modified to provide a two-diaphragm meter by retaining slack diaphragm 84 and omitting slack diaphragm 106. Other modifications will be apparent to those skilled in the art.

I claim:

1. In pressure measuring apparatus, in combination, a flexible tube having a fixed end and a movable end, a rod fixed to the movable end of said tube and extending through said tube, a flexible diaphragm responsive to the pressure to be measured, a rod-actuating member mechanically interconnecting said diaphragm and said rod, whereby deflection of said diaphragm in response to variations in said pressure produces through said rod-actuating member and rod a corresponding lateral force on said tube to cause the free end of said tube to be deflected, a pair of opposed bellows connected to each other at one end by a connecting member and fixed at their other ends, one of said bellows being of slightly greater diameter than the other and said connecting member being mechanically connected to said tube, whereby a force is exerted on said connecting member that is proportional to said lateral force exerted on said tube, a nozzle located within each of said bellows, means for supplying fluid under pressure to one of said nozzles, means for withdrawing fluid through the other of said nozzles, pressure equalizing means interconnecting said two bellows to maintain equal pressure in said two bellows, said nozzles being so located with respect to said connecting member that movement of said member varies the flow of fluid through said nozzles to maintain a pressure within said bellows that is substantially proportional to said measured pressure.

2. In apparatus for measuring the difference between two pressures, in combination, a closed chamber completely filled with liquid and having a pair of flexible walls, the external surface of one of said walls being exposed to one of said pressures and the external surface of the other of said walls being exposed to the other of said pressures, whereby forces applied to one of said walls are transmitted through said liquid to the other of said walls, a flexible tube closed at one end and connected at its other end to said chamber, mechanical interconnecting means so interconnecting said tube and one of said flexible walls that the difference between the pressures applied to said two flexible walls produces a corresponding lateral force on said tube and pneumatic means responsive to the magnitude of said lateral force for producing a pneumatic pressure that is proportional to the magnitude of said pressure difference.

3. In apparatus for measuring the difference between two pressures, in combination, a closed chamber completely filled with liquid and divided into two compartments by a resilient diaphragm, each of said compartments having an exterior non-resilient flexible wall, the external surface of one of said flexible walls being exposed to one of said pressures and the external surface of the other of said walls being exposed to the other of said pressures, whereby pressures applied to said walls are transmitted through said liquid to said resilient diaphragm, a flexible tube closed at one end and connected at its other end to said chamber, mechanical interconnecting means so interconnecting said diaphragm and said tube that deflection of said diaphragm in response to pressures transmitted through said liquid to said diaphragm produces a corresponding lateral deflecting force on said tube and pneumatic means responsive to the magnitude of said lateral force for producing a pneumatic pressure substantially proportional to the value of said pressure difference.

LYMAN COOK.

REFERENCES CITED

The following references are of record in the file of this patent:

UNITED STATES PATENTS

| Number | Name | Date |
|---|---|---|
| 1,173,038 | Roschanek | Feb. 22, 1916 |
| 1,323,119 | Sundbaum | Nov. 25, 1919 |
| 1,593,890 | Welch | July 27, 1926 |
| 1,992,343 | Ahnstrom | Dec. 3, 1935 |
| 2,105,127 | Petroe | Jan. 11, 1938 |
| 2,223,712 | Ziebolz | Dec. 3, 1940 |
| 2,276,580 | Hofer | Mar. 17, 1942 |
| 2,286,282 | Joesting | June 16, 1942 |
| 2,312,201 | Thompson | Feb. 23, 1943 |
| 2,316,203 | Simmons, Jr. | Apr. 13, 1943 |
| 2,431,297 | Moore | Nov. 18, 1947 |

FOREIGN PATENTS

| Number | Country | Date |
|---|---|---|
| 33,237 | Great Britain | Oct. 19, 1901 |
| 185,229 | Great Britain | Mar. 29, 1923 |